UNITED STATES PATENT OFFICE.

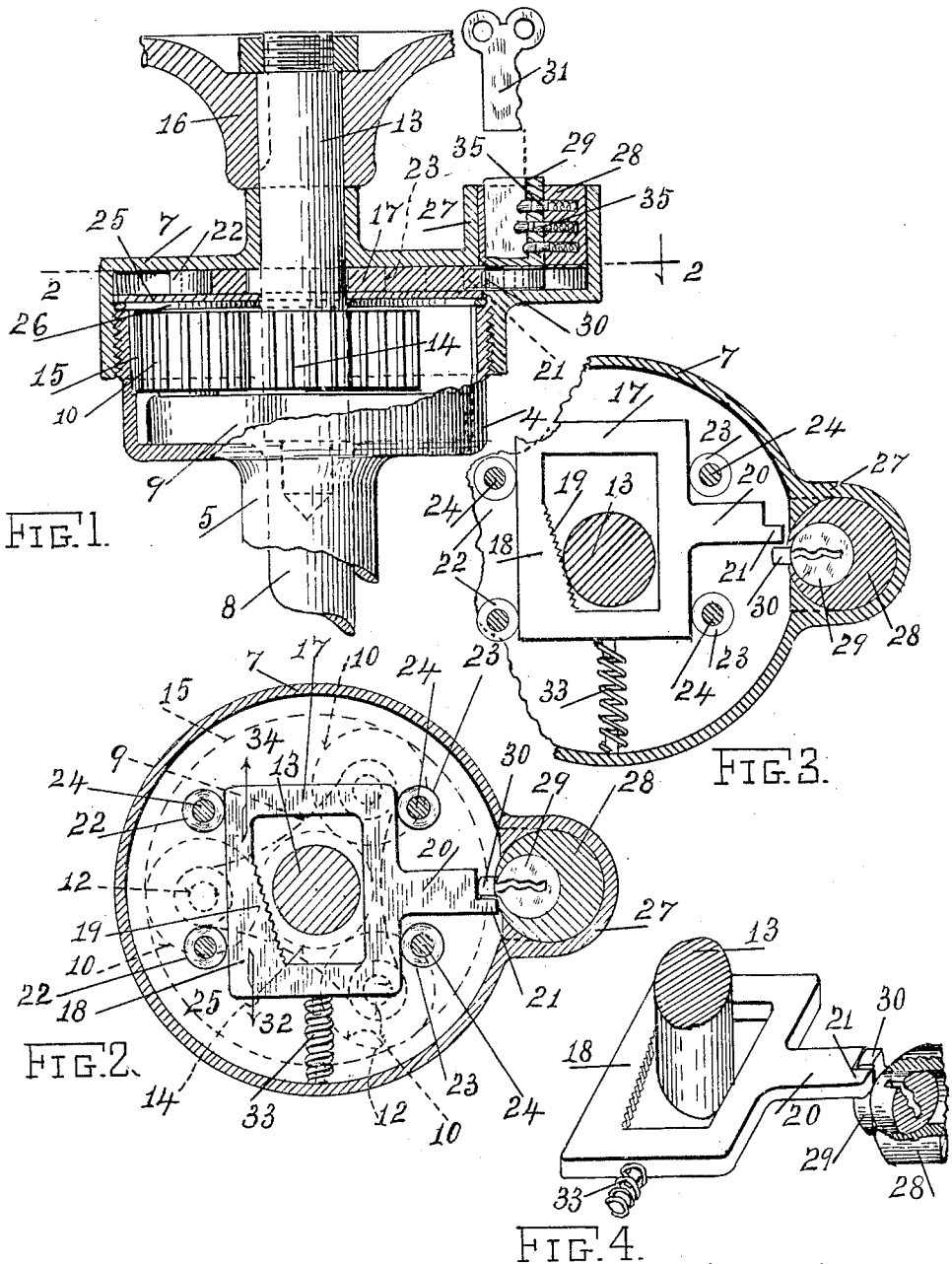

JAMES L. COOK, OF SPRINGFIELD, ILLINOIS.

STEERING-GEAR-LOCKING MECHANISM.

1,370,190.  Specification of Letters Patent.  Patented Mar. 1, 1921.

Application filed January 19, 1920. Serial No. 352,268.

*To all whom it may concern:*

Be it known that I, JAMES L. COOK, a citizen of the United States, residing at Springfield, in the county of Sangamon and State of Illinois, have invented a new and useful Steering-Gear-Locking Mechanism, of which the following is a specification.

The invention relates to mechanism for locking the steering gear of automobiles and other vehicles, and is specially applicable to vehicles of the type having planetary steering gear.

The purposes of the invention are: to provide effective means to prevent theft, or unauthorized use of vehicles; to provide in conjunction with a planetary steering gear, locking means which will lock the gear so that the vehicle may be steered only to a limited extent in one direction, say to the left; the mechanism being so constructed and arranged that limited rotation of the stub shaft to the left, while the locking device is effective, will operate the steering gear to cause one front wheel of the vehicle to travel inward toward the vehicle body until stopped by the wheel striking against a stationary member of the vehicle, the locking device being then in such close engagement with the periphery of the stub shaft that the shaft cannot be turned to the right until the locking device is unlocked; to provide wedging means having a tapered or wedge-like member adapted to engage on the circumference of the shaft which actuates the planetary steering gear to securely hold the shaft and keep it from rotating in one direction, but adapted to permit rotation of the shaft in the opposite direction; to provide means to prevent sticking of the wedging device, which in the present instance I call the wedge frame; to provide in conjunction with a casing, a train of planetary steering gears housed in the casing, and a screw cap on the casing; steering gear locking mechanism constructed in such manner and in such relation to the screw cap that counter-clockwise rotation of the cap in an attempt to unscrew it from the casing will effect counter-clockwise rotation of the steering shaft, thereby causing the front wheels of the vehicle to travel to the left in a circle until the left-hand vehicle wheel strikes against the vehicle frame and prevents further rotation of the shaft and also prevents further counter-clockwise rotation of the cap, and to provide improved details of construction.

The invention is illustrated in the annexed drawing, to which reference is hereby made, and will now be described and claimed.

Figure 1 is a longitudinal sectional view of a steering gear locking mechanism embodying my invention, some of the parts being shown in elevation; Fig. 2 is a horizontal section through the mechanism on the line 2—2 of Fig. 1, looking downward. Fig. 3 is a plan view of the same wedge frame and the same lock shown in Fig. 2, and shows the wedge member of the frame in engagement with the stud shaft; and Fig. 4 is a perspective view of a modified construction in which the axis of the lock proper is at right angles to the axis of the stud shaft. The same reference numerals designate the same parts in all the views.

The planetary steering gear is not part of the present invention, therefore only so much of said gear is shown as is necessary to show its relation to, and its control by the locking mechanism.

Well established custom and the ordinances of many cities require that vehicles using city streets must stop with the front wheels close to the curb on the right hand side, in the direction in which the vehicle is going. It is occasionally necessary, in case of fire, or other emergency, to move, for a short distance, vehicles the steering gears of which are locked. In order to admit of necessary restricted movement and prevent unrestricted movement of the vehicle, I provide means for controlling the necessary movement so that it will be circular, and while the vehicle may be circled to the left a short distance say across the street, it cannot be circled in the opposite direction and cannot be steered in a straight line in any direction and therefore cannot go very far away from its original position.

A cup-shape gearing case 4 is permanently attached to the usual steering column 5, which is stationary on the vehicle. The case 4 houses the usual planetary steering gears. The steering shaft 8, is rotative in the steering column 5.

A pinion-support 9 is permanently attached at the upper end of the steering shaft 8. Pinions 10 are rotative on studs 12 on the support 9.

A stud shaft 13 is rotative in the upper end of the steering shaft 8 and carries a pinion 14 which is in mesh with the several pinions 10. The casing 4 has an internal circular rack 15 in mesh with the several pinions 10.

Upon rotation of the stud shaft 13 the pinion 14 will drive the pinions 10 which traveling in engagement with the stationary circular rack 15 will cause clockwise or counter-clockwise rotation of the pinion support 9, and the connected steering shaft 8, according to the direction of rotation of the stud shaft 13.

The steering wheel 16 is attached at the upper end of and serves to rotate the stud shaft 13, to steer the vehicle.

The wedge frame.

The wedge frame, designated as a whole by the numeral 17, is an approximately rectangular metal frame comprising a tapered wedge member 18 having serrations 19 along its inner edge; and a laterally extended arm 20 having a terminal finger 21. Antifriction rollers 22 22 and 23 23 are rotative on studs 24, extending downwardly from the top of the cap. The rollers guide and facilitate longitudinal sliding of the wedge frame and prevent transverse movement of the frame. A coiled spring 33, is compressed by the outwardly sliding frame and acts to slide the frame inwardly. A circular plate 25 having a central opening accommodating the shaft 13, supports the wedge frame, the rollers and the spring 33 and is kept in place by an approximately circular spring 26 engaging on the inner circumferential wall of the cap 7.

The lock.

The lock is designated as a whole by the numeral 28 and is preferably of the type known as "pin locks". It is to be understood however that any other suitable lock adapted to slide the wedge frame 17 to compress the spring 33 and hold the wedge frame in its retracted, or disengaged position, may be used without departure from my invention.

I have shown in the drawings (Figs. 1 and 2) and prefer to use a lock having its axis parallel to the axis of the stud shaft 13, but a lock having its axis at right angles to the axis of the stud shaft as shown in Fig. 4; or a lock having its axis at any other suitable angle relative to the stud shaft, may be used to operate the wedge frame, and is clearly within the scope of my invention. The body of the lock 28 is suitably secured in an extension 27 preferably integral with screw cap 7. The lock cylinder 29 is rotative both clockwise and counter clockwise by a key 31. In locks of the preferred type each lock has its own special key. At the inner end of the cylinder 29 is a lever 30. The key 31 is used to effect counter-clockwise rotation, of the cylinder 29 to cause the lever 30 to engage the finger 21 to slide the wedge frame in the direction indicated by the arrow 32 to compress the spring 33, and upon withdrawal of the key the well known spring-actuated locking pins 35 will engage in the holes in the cylinder which are in line with the pins, to lock the cylinder so that it cannot be rotated until the key is again inserted in the cylinder. In Fig. 2 the wedge frame 17 is shown in disengaged position relative to the stud shaft 13, that is to say the shaft is free to rotate either clockwise or counter-clockwise without engagement with the wedge frame. The key having been removed, the lock cylinder 29 is stationary and cannot be rotated until the key is again inserted in the cylinder. So long as the cylinder 29 remains at rest in the position shown the lever 30 on the cylinder being stationary will be engaged by the finger 21 at the end of the arm 20 of the wedging frame.

Upon inserting the key in the cylinder lock, the key will be used to effect clockwise rotation of the cylinder to withdraw the lever 30, from the path of the finger 21 and thereupon the wedge frame, actuated by the spring 33, will slide in the direction indicated by the arrow 34 to cause the serrated member 18 of the wedge frame to engage the circumference of the stud shaft 13. When the member 18 is in engagement with the circumference of the shaft it is obvious that counter-clockwise rotation of the shaft will slide the wedge frame in the direction indicated by the arrow 32 and therefore the wedge frame cannot prevent counter-clockwise rotation of the shaft; but very slight clockwise rotation of the shaft will cause the shaft to engage with the member 18 and drag the wedge frame in the direction indicated by the arrow 34 and cause the member 18 to bind tightly on the circumference of the shaft and thereby positively lock the shaft against clockwise rotation.

The above described co-action of the wedge plate and the shaft is of the essence of my invention.

Preventing unscrewing of the cap.

I have found by experiment that one complete counter-clockwise rotation of the studshaft will be more than sufficient to cause the front wheels of the vehicle to travel in a circle until the left-hand front wheel strikes against the frame of the vehicle and prevents further counter-clockwise rotation of the shaft. I have also found that the planetary gears in the casing are of such depth that they cannot be disengaged by partially unscrewing the cap. Inasmuch as counter-clockwise rotation of the screw cap and the wedge plate carried thereby while the shaft is at rest, is in effect equivalent to clockwise rotation of the shaft 13 while the cap is at rest, it is obvious that counter-clockwise rotation of the cap 7, in an attempt to unscrew and remove the cap while the member 18 is engaged with the shaft 13, will produce counter-clockwise rotation of the shaft and will cause the front wheels to travel in a circle until the left hand front wheel strikes against the frame of the vehicle and prevents further rotation of the shaft, thereby preventing complete unscrewing and removal of the cap.

I believe that I am the first to devise and use in conjunction with a rotative shaft actuating a train of planetary steering gears, a wedging device sliding in one direction to engage the circumference of the actuating shaft to immediately lock the shaft against clockwise rotation and slidable reversely to release the shaft to permit counter-clockwise rotation of the shaft. I therefore do not restrict the claims to the precise construction herein set forth.

Having fully described my invention what I claim as new and desire to secure by Letters Patent is:

1. The steering gear locking mechanism comprising a rotative shaft; a wedge-frame slidable relative to the shaft and adapted to engage on the circumference of the shaft to prevent rotation of the shaft in one direction, also adapted to yield to permit the shaft to rotate in the opposite direction and means for engaging the wedge-frame with the shaft.

2. In steering gear locking-mechanism, the combination of a rotative shaft; and a spring pressed wedge in frictional engagement with the circumference of the shaft and adapted to prevent clockwise rotation of the shaft.

3. In steering gear locking mechanism, the combination, of a rotative shaft; and a spring pressed wedge in frictional engagement with the circumference of the shaft and adapted to yield automatically to permit counter-clockwise rotation of the shaft.

4. In steering gear locking mechanism, the combination of a rotative shaft; and a wedge slidable in one direction into frictional engagement with the circumference of the shaft to prevent clockwise rotation thereof and automatically yielding to admit of counter-clockwise rotation of the shaft.

5. In steering gear locking mechanism, the combination of a gear case, a train of planetary steering gears in the gear case, a stud shaft co-acting with the gears in the gear case; a screw cap rotative counter-clockwise relative to the gear case; and a wedge frame carried by the screw cap and co-acting with the stud shaft to effect counter-clockwise rotation of the shaft in unison with the counter-clockwise rotation of the cap to an extent limited by the vehicle wheel stopping against the frame.

6. In steering gear locking mechanism, the combination of a rotative shaft; a slidable wedge in frictional engagement with the circumference of the shaft to prevent rotation of the shaft in one direction; and a lock adapted to disengage the wedge from the shaft and keep it disengaged from the shaft.

7. In steering gear locking mechanism, the combination of a rotative shaft; a spring-actuated wedge movable relative to the shaft and adapted for frictional engagement with the circumference of the shaft to hold it against clockwise rotation and automatically retractive upon reverse rotation of the shaft.

8. In steering gear locking mechanism, the combination of a rotative steering shaft; a wedge slidable to and fro relative to the shaft; and a spring acting to slide the wedge in one direction to hold the wedge in close frictional contact with the circumference of the shaft and yielding to permit retraction of the wedge.

9. In steering gear locking mechanism, the combination of a rotative shaft; a wedge slidable outwardly and inwardly relative to the shaft and adapted for frictional engagement with the periphery of the shaft; a spring compressed by outward movement of the wedge; and a lock adapted to move the wedge outwardly to compress the spring and also adapted to release the wedge to permit the spring to slide the wedge inwardly.

10. In steering gear locking mechanism, the combination of a rotative shaft; a wedge-frame slidable inwardly and outwardly relative to the shaft; and rollers guiding sliding movement of the wedge frame and preventing lateral movement thereof.

11. In steering gear locking mechanism, the combination of a cap; a rotative shaft extending outwardly through the cap; a slidable wedge frame in operative relation to the shaft; rollers guiding the sliding movement of the wedge-frame; a plate supporting the wedge-frame and the rollers; and means for securing the plate in the cap.

12. The steering gear locking mechanism comprising a rotative shaft; a train of planetary gears actuated by said shaft; and a wedging device moving in one direction for frictional engagement with the circumference of the shaft to immediately lock the shaft against clockwise rotation and yielding automatically to permit counter-clockwise rotation of the shaft.

13. In steering gear locking mechanism, the combination of a rotative shaft; a train of planetary gears actuated by the shaft; and a wedging device engaging frictionally with the periphery of the shaft to prevent clockwise rotation of the shaft and yielding automatically to permit counter-clockwise rotation of the shaft.

14. In steering-gear locking-mechanism, the combination of a rotative stud shaft; planetary steering gears coacting with the stud shaft; an engaging-device engaging frictionally on the periphery of the stud shaft to prevent rotation of the shaft in one direction only; and a lock controlling the action of said engaging-device.

Signed at Springfield, Illinois, this 12th day of January, 1920.

JAMES L. COOK.

Witnesses:
W. S. TROXELL,
RAY G. TROXELL.